Patented Oct. 24, 1922.

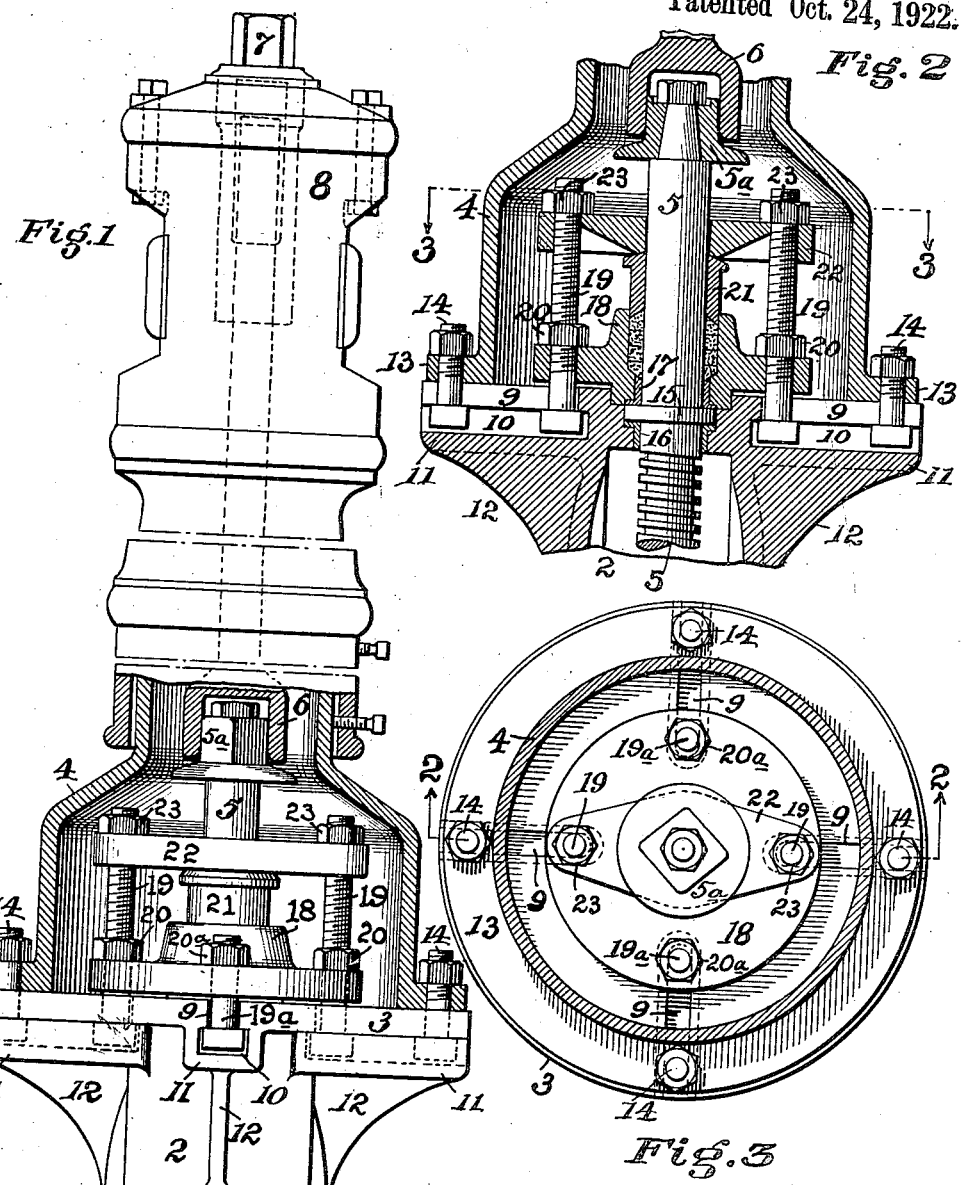

1,433,139

UNITED STATES PATENT OFFICE.

HERBERT M. LOFTON, OF CHATTANOOGA, TENNESSEE.

VALVE.

Application filed February 19, 1921. Serial No. 446,243.

*To all whom it may concern:*

Be it known that I, HERBERT M. LOFTON, a citizen of the United States, and resident of Chattanooga, county of Hamilton, and State of Tennessee, have invented an Improvement in Valves, of which the following is a specification.

The object of my invention is to provide a construction of valve having features especially adapted for the use of an indicator post for indicating the open and shut conditions of the valve.

It is customary in hydraulic engineering to equip gate valves of buried water mains with means extending above the ground, whereby they may be operated similarly to fire hydrants, which means, however, are adapted for attachment to gate valves of various sizes and constructions so that such means may be applied to different sizes of gate valves.

My present improvement is to provide a special construction of the upper part of gate valves, whereby the indicator post may be readily clamped in position as an upper extension to the valve proper and which will, moreover, obviate the necessity of any machine work on the valve structure in providing connection with the indicator post.

More particularly, my invention consists of a gate valve provided with an upper flanged casing having a plurality of radial slots adapted to receive bolts and permit radial adjustment therein, and further combining with the said gate valve an indicator post having means for operating the spindle of the valve, and further having its lower end adapted for seating upon the flange of the check valve and to be clamped thereon by the bolts.

My invention also embodies certain features for packing the valve stem of the gate valve and in which the said means is retained in position by means of bolts also adapted to the radial slots, aforesaid.

My invention further consists of details of construction which, together with the features above specified, are more fully set out in the drawing and defined in the claims.

Referring to the drawing: Fig. 1 is an elevation of the upper portion of a gate valve and its indicator post structure, with a portion thereof in section; Fig. 2 is a vertical sectional view of the upper part of the gate valve and lower part of the indicator post mechanism, the section being taken on line 2—2 of Fig. 3; and Fig. 3 is a transverse section of the same taken on line 3—3 of Fig. 2.

2 is the gate valve proper and may be made of any suitable construction. Its upper part is provided with a circular flange 3 which is provided with radial portions 11 on its underside in each of which is formed a radial slot 9 opening to the upper part of the flange and provided at its lower part with a wider radial groove 10, said radial slot and groove being adapted to receive the shank and head of suitable bolts 14 and 19. These radial parts 11 may be strengthened by under-ribs 12 cast integral with the casing.

5 is the vertical screw threaded spindle of the gate valve and is provided with an annular collar 15 and above it an upper cylindrical extension to the top of which is clamped the square shaped head $5^a$ with which the bottom of the stem 6 engages, and by which the screw threaded spindle of the valve may be rotated. 16 is a bronze bushing fitted into the flange portion of the casing for receiving the valve spindle and upon which the collar 15 thereof rests. 18 is the stuffing box and is circular in shape and provided at the lower part with a circular projecting portion which fits tightly into an annular groove in the top of the flange 3 and is further provided with a bushing 17 of bronze which presses directly upon the upper part of the collar 15 to hold the spindle from rising, said collar being free to rotate between the bushing 16 and 17, whereby the spindle is held from rising during its rotation. The stuffing box 18 is clamped down in position by means of bolts 19 fitted into the radial slots and provided with nuts 20 which press directly upon the flange of the stuffing box. In addition to the two bolts 19 shown in Figs. 1 and 2, there are two additional bolts $19^a$ having nuts $20^a$, as shown in Fig. 3, these latter bolts being shorter than the bolts 19, in that they are only required to clamp the flange of the stuffing box. 21 is the gland of the stuffing box and is pressed downward upon the packing by a cross bar 22 centralized upon the cylindrical portion of the spindle and forward toward the stuffing box by means of nuts 23 upon the upper ends of the bolts 19. In this manner, these bolts 19 are not only utilized for clamping the stuffing box in position, but also for adjusting the transverse bar or follower 22 in forcing the gland 21 into the stuffing box and upon the packing therein. As shown, the juncture between the gland 21 and the cross bar 22 is made of a ball and socket construction, so that these parts automatically adjust themselves while sliding along the valve spindle.

4 is a bonnet which is provided at the bottom with an outwardly extending flange 13 having four bolt holes through which bolts 14 extend, the head ends of said bolts fitting the radial slots and grooves 9, 10, in the valve casing before referred to. I have found, in practice, that four radial slots and grooves are sufficient, and while I do not limit myself to the number of such slots and grooves, I prefer four in that there is better clamping action, and moreover, the bonnet is centralized thereby upon the valve casing. The bonnet 4 extends over the stuffing box and is provided with an upward extension 8 constituting a tubular post which, in ordinary practice, is provided with suitable indicating apparatus (forming no part of the present invention) and said post at its extreme upper part is provided with a nut 7 by which the stem 6 may be rotated for rotating the spindle of the valve. I do not restrict myself to the particular details of construction of the post or its connection with the bonnet, as these parts may, if desired, be all of one piece.

From the construction above described, it will be apparent that the various bolts 14, 19, and 19ª may readily be adapted to and adjustable upon the upper portion of the valve casing, so as to obviate all special controlling and tapping of holes and which may, moreover, permit the use of ordinary bolts. Furthermore, it is evident that by having four radial slots and grooves, the bonnet and post may be readily adapted to any of the valves provided the four holes in the bonnet are carefully bored at equal distances apart, for, under such conditions, the bolts extending through such holes are assured proper adjustments in the slots and grooves and at the same time necessarily center the bonnet properly upon the circular flange of the gate valve.

It will be, furthermore, understood that by employing the radial slots and grooves, it is possible to not only remove the bonnet, but also the follower and stuffing box without the bolts dropping down and becoming displaced, thereby providing an inexpensive manner of applying the bolts to the valve and bonnet and at the same time one which permits automatic adjustment of the bolts upon the valve.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a valve, the main casing having at the top a flanged portion provided with a plurality of radial slots, a stuffing box and valve stem for the casing, a hollow post extending upwardly above the valve casing and resting at the bottom upon the said casing and also provided at the top with means for operating the valve stem; and bolts adjustably extending through the radial slots and clamping the lower end of the tubular post tightly upon the flange of the casing about the stuffing box and valve spindle.

2. The invention according to claim 1, wherein there are four radial slots in the casing arranged at equal angles apart and in which the tubular post is provided with an outwardly directed flange at the bottom through which the clamping bolts pass, said bolts and slots centralizing the hollow post axially about the valve spindle.

3. The invention according to claim 1, in which further the stuffing box is provided with a flange and is detachable upon the top of the valve casing and clamped firmly in position by additional bolts extending through the radial slots and flange of the stuffing box and provided with clamping nuts above said stuffing box flange.

4. The invention according to claim 3, in which further there is provided a stuffing box gland surrounding the valve spindle, and a cross bar or follower resting upon the gland and through which the clamping bolts for the stuffing box extend, and nuts upon said bolts for clamping the follower down upon the gland to cause it to press upon the packing.

5. The invention according to claim 1, further characterized by having the stuffing box formed with a flange and adapted to make a tight joint with the top of the valve casing, a stuffing box gland surrounding the valve spindle for compressing the packing into the stuffing box, a cross bar or follower pressing upon the gland, four bolts extending upwardly through the radial slots of the valve casing and through the flange of the stuffing box, and two of said bolts also extending through the cross bar or follower, nuts upon the bolts for clamping the stuffing box tightly upon the valve casing, and additional nuts upon the two long bolts for clamping the cross bar or follower down upon the gland.

6. In a valve, the combination of the main casing having a flange at its top provided with a plurality of radial slots and also having an annular shouldered portion, a valve spindle having an annular collar fitting the annular shouldered portion to prevent movement in one direction, a stuffing box surrounding the spindle and tightly fitting the valve casing above the annular collar of the spindle to prevent its movement in the other direction, a gland for the stuffing box surrounding the spindle for compressing the packing in the box, a cross bar or follower resting upon the gland, a plurality of bolts extending up through the slots of the casing and through the flange of the stuffing box, two of said bolts also extending through and above the cross bar or follower, nuts upon said bolts for pressing upon the upper surface of the flange of the stuffing box for clamping the said box tightly in position upon the valve casing, and additional nuts upon the long bolts for clamping the cross bar or follower down upon the gland.

7. The invention according to claim 6, wherein the connection between the top of the gland and the bottom of the cross bar or follower is made ball and socket shape.

8. In a valve, the combination of the main casing having a flange at its top provided with a plurality of radial slots and also having an annular shouldered portion, a valve spindle having an annular collar fitting the annular shouldered portion to prevent movement in one direction, a stuffing box surrounding the spindle and tightly fitting the valve casing above the annular collar of the spindle to prevent its movement in the other direction, means surrounding the spindle for compressing the packing in the stuffing box, a plurality of bolts extending up through the slots of the casing and through the flange of the stuffing box, two of said bolts also extending above the means for compressing the packing in the stuffing box, nuts upon said bolts for pressing upon the upper surface of the flange of the stuffing box for clamping said box tightly in position upon the valve casing, and additional nuts upon the long bolts for clamping the said means surrounding the spindle for compressing the packing in the stuffing box.

In testimony of which invention, I hereunto set my hand.

HERBERT M. LOFTON.